United States Patent Office 3,027,239
Patented Mar. 27, 1962

3,027,239
METHOD FOR DETECTING AND REMOVING METALLIC CATIONS FROM SOLUTIONS
Robert E. D. Clark, Cambridge, England, assignor to Fisher Scientific Company, Pittsburgh, Pa., a corporation of Pennsylvania
No Drawing. Filed Jan. 17, 1958, Ser. No. 709,476
1 Claim. (Cl. 23—230)

The invention relates to a method of and means whereby thiophilic elements in a state of combination or otherwise and inclusive of elemental sulphur may be detected, removed from solution or suspension and/or separated from other thiophilic or non-thiophilic cations.

According to the invention use is made of a class of reagents, namely certain aromatic mercaptans and their derivatives, which form stable chelate complexes with metals, the said complexes being caused to form either homogeneously, as precipitates or in solution, or to become adsorbed upon the surface of precipitates of a chemically dissimilar kind.

According to a feature of the invention means are also provided whereby the said class of reagents may be more conveniently rendered available than heretofore for the purposes aforementioned.

The invention, applied in any of the ways to be hereinafter disclosed, is of use in the laboratory identification and estimation of thiophilic elements, in the said separation of the said elements from one another, in the purification of many chemical products, in the coagulation and precipitation of certain colloids, in the sequestering of unwanted ions, in the rapid testing of ores under field conditions and in the dressing of certain ores prior to flotation.

In order better to explain the nature of an important feature of the invention, hereinafter to be described, reference may be made to the well known fact that metals may sometimes be separated by the use of hydrogen sulphide, which preferentially precipitates the less soluble sulphides before those which are more soluble.

Thus, if copper and cadmium are present in a solution, the copper easily separates as copper sulphide on passing hydrogen sulphide through the strongly acidified liquid, whilst cadmium sulphide is subsequently precipitated by the same reagent after lowering the acidity. Alternatively, separation may also be effected by passing hydrogen sulphide at the lower acidity when the copper is precipitated first and is followed by cadmium.

By either of these methods, collectively referred to hereafter as the method of consecutive precipitation, metals may be separated from one another and may also, occasionally, be tested for in presence of one another. Thus, in the instance cited, cadmium may be tested for in presence of copper since, provided the copper sulphide has coagulated sufficiently, the appearance of yellow cadmium sulphide after continued passage of the gas, will be at once apparent.

Although this method of separation is often of value it suffers from two serious drawbacks which have hitherto limited its scope both in analytical chemistry and on the industrial scale.

Firstly, it is difficult to effect a sufficiently rapid removal of the precipitates as they are formed and if repeated filtration is resorted to the method becomes clumsy and slow.

Secondly, there is often no way of determining when one cation has precipitated and the next is about to precipitate. But unless this can be done the method is of little value.

Several features of the present invention are concerned with methods of overcoming these difficulties and with means whereby the same may be effected. The invention thus greatly enlarges the possibilities inherent in the said method of consecutive precipitation. It makes possible the rapid separation of cations and it often makes possible the almost immediate detection of a particular ion in complex mixtures. Moreover, the rapid coagulability of the class of compounds to be hereinafter referred to may be conferred upon other precipitates, notably the sulphides, since these may often readily be coated with thin layers of the said compounds so that like the latter they become hydrophobic in character.

According to the present invention these desirable objectives are achieved by the use of aromatic mercaptans, such mercaptans being characterized by the presence of at least two mercapto groups, one or more of which may be suitably substituted, the sulphur atoms being so positioned as readily to chelate with thiophilic cations. Thus the said mercapto groups may occupy positions 1:2 in the benzene or 1:8 in the naphthalene nucleus.

Chemically, the said class of reagents may be compared with hydrogen sulphide. In the simplest case members of this group are, like hydrogen sulphide, dibasic acids, and the elementary theory that applies to precipitations by hydrogen sulphide may be applied also to them without modification. But they have the advantage that, as a result of the resonant qualities inherent in the aromatic nucleus, they give rise to many highly and distinctively coloured metallic derivatives. Moreover, the complexes formed are in general more stable and less soluble than the sulphides. And since their molecules are clothed with hydrocarbon residues, they are often hydrophobic and non-wetting—this circumstance making for a higher degree of coagulation than is commonly encountered among the sulphides.

The use of this class of reagent in testing for metals is well known. Toluene-3:4-dithiol (hereinafter referred to as dithiol) which is probably the most accessible member of the group, was first described in 1936 (W. H. Mills and R. E. D. Clark, Journal of the Chemical Society, p. 175). In the same year (Analyst, 1936, vol. 61, p. 242) I drew attention to the fact that compounds of this class afford a specific and highly sensitive reagent for the element tin and that they give rise to coloured derivatives, hereinafter referred to as mercaptides, with many heavy metals.

Despite two decades of widespread use, however, no attention has been drawn to many of the valuable properties of this class of reagent. Most of its specific or highly selective reactions with cations and its other desirable properties have remained undiscovered. As a result dithiol, the only member of the class to be made commercially, has remained a little known product sold in small quantities only and at a high price.

These facts must be ascribed chiefly to the difficulties hitherto associated with the use and storage of dithiol.

Since the beginning of its commercial manufacture in 1936 or soon afterwards, dithiol has been marketed in sealed ampoules since it keeps badly when exposed to air. Its solutions, especially those in alkali, are even more unstable to air than free dithiol and must usually be kept in a refrigerator or even under hydrogen. The original suggestion that, after dissolution, the reagent should be stored in presence of an excess of thioglycollic acid, has often been adopted. Nevertheless the solutions are not very stable whilst the presence of thioglycollic acid is rarely desirable.

The widespread use of thioglycollic acid has, in fact, obscured many reactions in an acid and all reactions in an alkaline medium—especially those with copper, cobalt, iron and vanadium. In an acid solution, moreover, the difficulty of obtaining dithiol in complete absence of the disulphide, its oxidation product, has also obscured its highly selective reactions with arsenic and germanium.

It is only as a result of a feature of the present invention which provides means whereby dithiol may be obtained at will, that these and other reactions have come to light.

According to a first feature of the present invention, the said class of compounds is caused to react with metallic cations to form mercaptides which, as a result of their hydrophobic nature, high coagulability and/or solubility in organic solvents, are removed from solution almost immediately after formation, so that the change in colour, or other property, of the freshly formed precipitate produced by further addition of the said class of reagents, resultant upon the total removal of a particular cation, becomes at once apparent and separation of metallic cations is readily effected.

The said mercaptides are conveniently removed from acid or neutral solution by filtration or by simple decantation of the mother liquor. They may also be removed by means of suitable solvents. Often, however, better results may be obtained by utilizing the power of common solvents to effect separation by preferential wetting of mercaptide precipitates, the latter remain undissolved. In any of these ways very complete separation is at once effected.

With the said class of compounds it happens, in most cases, that as soon as one metal has been precipitated, there is a sharp change in colour in the freshly formed precipitate immediately the next metal begins to precipitate. And the solution being clear, the colour change is readily visible. Thus a sharp indication is given of the point at which the earlier formed precipitate should be removed in order to effect separation.

When deemed so desirable, the sharpness of separation may be improved by suitable reduction of acidity. If the acidity of the solution is, to begin with, too high to permit of the separation of a second metal, the colour change observed is that from the mercaptide of the first metal to the pure white of free dithiol precipitated in acid solution. After removal of the first formed precipitate, water is added in suitable quantity to permit of the precipitation of a second mercaptide, should this be so desired, after which the operations may be again repeated until all metals capable of precipitation have been removed. Finally, if so desired, any excess of reagent is easily removed by means of a current of air when the reagent is in part volatilized and in part oxidized. The oxidation product may then be removed by filtration or extraction. Alternatively, steam may be used when less oxidation will occur.

In many cases separated metals are easily recovered as their chlorides from their precipitated mercaptides. For this purpose the latter are heated with hydrochloric acid. If an organic solvent is also added, much of the reagent may also frequently be recovered. When hydrochloric acid fails to decompose the complexes, an oxidizing agent is also added when the mercaptide part of the molecule is easily destroyed, or the solid mercaptides may be heated strongly to give free metals or oxides.

This feature of the invention may be embodied in a variety of indirect procedures wherein use is additionally made of precipitants other than the said class or reagent.

Further to exemplify this modification of the present feature of the invention, let it be supposed that it is desired to purify the compound sodium chloride from traces of potassium. Let NaG represent a water-soluble sodium salt, and KG the potassium salt which is supposed insoluble. To the solution of sodium chloride, slightly acidified with hydrochloric acid, NaG is added in excess, KG being removed by filtration. To the filtrate mercuric chloride is added in slight excess, an insoluble mercury compound being removed by filtration. To the filtrate dithiol, dissolved in alcohol is added in slight excess, when the mercury complex is precipitated. Air is then blown through the mixture when the alcohol and some dithiol are removed and dithioldisulphide precipitated. The solution, after removal of the precipitated solid and neutralization with soda, now contains sodium chloride free from potassium.

According to a second feature of the invention, the said class of reagent is used to form readily removable mercaptides in alkaline solution. For such application it is necessary that the metal shall be capable of forming base soluble complexes with an excess of reagent. A strong solution of the salt which it is desired to purify is extracted with an organic basic solvent, substantially insoluble in the salt solution, containing a small proportion of the said class of reagent. In this way many metals are readily and quickly removed. The method is of particular value in removing traces of iron from a variety of commercial chemicals but may also be used for the removal of lead, copper, cobalt, vanadium and other elements.

According to a third feature of the invention the said class of compounds is caused to react with the surface of already existent precipitates or powdered solids, thereby conferring upon them some or all of the properties associated with the said mercaptides but notably a high degree of coagulability and/or a change in angle of contact of suspending fluid upon the particles relative to a second fluid such as air or a suitable organic liquid, the said changes resulting in the ready removal of the said precipitates or powdered materials from the fluids in which they are suspended.

This feature of the invention is of value both in the laboratory and on the industrial scale for precipitating colloids, notably colloidal sulphur and sulphides, and thus aiding, in particular, the precipitation of sulphides by means of hydrogen sulphide.

It is of value also in the dressing of ores prior to flotation or other similar processes of separation.

According to a fourth feature of the invention means are provided whereby the said class of reagents, and dithiol in particular, may be rendered immediately and readily available, if necessary in complete absence of their oxidation products.

According to this feature of the invention, the difficulties associated with the storage of said class of reagent are overcome by preparing suitable simple derivatives of the said class of reagent, which can be converted into the parent compounds shortly before use, or may, in some instances, be used without such conversion.

More specifically, a diacyl derivative, such as the diacetyl derivative, may be used. Thus it has been found that diacetyldithiol can be stored in ordinary containers for long periods with little or no decomposition and that its solutions in solvents can be kept for a considerable time. Yet free dithiol may be regenerated at will from it within 15–30 seconds.

In like manner use may be made of the even more stable diaroyl derivatives, such as dibenzoyldithiol, though the ease with which this may be hydrolysed to dithiol is less than that with the diacetyl derivative.

In like manner use may be made of certain metallic derivatives. Of these the zinc salt has been found to be better suited than any other since it alone offers the advantages that it is colourless, that it is readily soluble both in alkali and in aqueous alcoholic hydrochloric acid, that it is readily prepared from commercially available materials which are free from metals which give colours with orthodimercaptobenzenes and that the metal in this derivative is easily replaced by most other metallic thiophilic ions so that the said salt may usually be used directly in place of free dithiol.

In place of the zinc salt the cadmium, gallium or indium salts, which are likewise colourless, may sometimes be used but they rarely offer any advantages. The cadmium salt is, however, occasionally useful as when it is used as a test for lead with which it gives a bright yellow precipitate although unlike the zinc salt it gives no coloured precipitate with thallium.

With bases the metallic salts readily give adducts. Thus the zinc salt reacts with two molecules of pyridine or one molecule of ethylenediamine. These adducts may often be obtained crystalline and they may usually be used in place of zinc, cadmium, gallium, or indium salts as a source of dithiol. I believe, however, that they offer no advantage over the simple metallic derivatives.

By these preferred means the parent mercaptans are stored and rendered readily available as required.

According to a fifth feature of the invention one or more of the means provided in the preceding feature are employed in order, rapidly, to prepare standard solutions of the said class of reagent, such solutions being of great value for the rapid determination of many elements in solution.

According to a sixth feature of the invention, the derivatives referred to in feature 4 afford more than mere storage compounds of dithiol and like mercaptans, since they possess valuable properties on their own account, this being particularly true of diacetyldithiol. Thus this compound will give precipitates with some metals without removal of the acetyl groups, or precipitates in which one acetyl group only has been removed. Such compounds, like the said mercaptides, are often of low solubility and are likewise strongly hydrophobic. Use may be made of them in effecting separations of cations as aforedescribed in feature 1. In certain instances they also afford highly selective reagents for elements.

Diacetyldithiol is also readily fat soluble and so may be used as a sequestering agent for heavy metals, thus it may be added to fats in order to prevent the onset of rancidity caused by the presence of traces of copper. It is apparently of low toxicity and mucous membranes are relatively insensitive to its action. The compound is also a powerful coagulant for sulphides and for sulphur in acid or neutral solution and may be used directly in place of the free mercaptans as described in feature 3.

The zinc complexes also have the advantages that they may readily be prepared entirely free from dithioldisulphides so that, on addition to an acid solution, they generate the mercaptans entirely free from admixture with the latter compounds, this being extremely difficult to accomplish in other ways but of great value in testing for arsenic and germanium.

According to a seventh feature of the invention, the means provided in feature 4 are applied for the purpose of testing ores, often in complex combinations, under field conditions with few chemical reagents and no apparatus other than test tubes, a teat pipette, a glass slide and a source of heat, in a total time which rarely exceeds one minute. This feature of the invention is of great value in mineral prospecting since, hitherto, it has proved virtually impossible to make use of the reactions of dithiol under field conditions, even for the purpose of testing for tin, owing to the storage difficulties associated with the compound.

In order that the nature of my invention may be better understood, it will now be more particularly described with reference to certain of the chemical principles involved and to specific chemical processes in which one or more features of the invention are embodied.

The first feature of the invention may be used to separate cations which, in hydrochloric acid solution (palladium to lead) or acetate buffer (below lead) are precipitated substantially in the order—

Palladium (ii) _____ (Brick red.)
Tellurium _____ (Yellow, red or purple, reducing to tellurium.)
Gold _____ (Brownish-pink.)
Selenium _____ (White or yellow.)
Tungsten (vi) _____ (Colourless or blue.)
Rhenium (vii) _____ (Green.)
Osmium _____ (Deep purple.)
Rhodium _____ (Yellow brown—a strong reducing agent must also be present with rhodium (iii).)
Arsenic _____ (Pale yellow.)
Iridium _____ (Black.)
Ruthenium _____ (Brown.)
Germanium _____ (White.)
Copper (i) _____ (White.)
Mercury _____ (Pale yellow.)
Silver _____ (Yellow.)
Antimony _____ (Orange.)
Tin _____ (Red.)
Copper (ii) _____ (Black.)
Molybdenum _____ (Green.)
Platinum _____ (Violet.)
Bismuth _____ (Orange red.)
Cobalt _____ (Black.)
Lead _____ (Yellow.)
Cadmium _____ (White.)
Thallium _____ (Pale orange.)
Nickel _____ (Greenish-black.)
Zinc _____ (White.)
Iron (ii) _____ (Black.)
Tin (ii and iv) _____ (In acetate buffer, yellow and white.)
Gallium _____ (White.)
Indium _____ (White.)
Manganese _____ (Dark green.)

To this list polonium and technetium should be added. A consideration of the correlation between order of precipitation and position in the periodic table of the elements suggests that the position of polonium is near to that of palladium and that of technetium near to that of germanium. It is likely that the precipitates with both elements will prove to be highly coloured.

Separations of adjacent metals near the beginning of the list are apt to be incomplete owing to the extreme insolubility of the products whilst separations at the end of the list are less generally useful.

It will at once be evident that many useful separations may be effected by utilizing this feature of the invention.

*Example 1*

Separation of platinum metals: A 10-normal hydrochloric acid solution containing palladium (ii), rhodium (iii), iridium (iii) and platinum (ii or iv), conveniently in concentrations of .01–.1 molar, is heated to 70° and vigorously stirred whilst alcoholic dithiol solution is added slowly. Palladium is precipitated first. When the freshly formed precipitate changes to white the palladium is removed and the solution diluted somewhat. Iridium and then platinum, the latter at about 1–2 normal acid strength, are similarly separated. On adding sodium hypophosphite together with more dithiol rhodium is precipitated. The free metals are obtained by heating the dry precipitates or in any other convenient way.

*Example 2*

Separation of elements from byproducts of atomic fission: To the strongly acid solution which may contain nitric acid in a concentration of 4 normal or more, dithiol is added as in Example 1, when the elements are separated in order as before. With elements below silver in the series, and in presence of nitric acid, the dithiol is apt to be oxidized in place of the formation of metallic complexes. Once separated the dithiol in the precipitate is destroyed by strong heating, oxidation by nitric acid or by other means, the precipitate dissolved in acid and the separation repeated.

Examples 3 and 4 illustrate the separation of heavy metals from neutral or acid solutions of soluble compounds.

Example 3

Purification of magnesium sulphate: To a hot neutral solution of the salt, dithiol, suitably dissolved in chloroform-alcohol solution as conveniently made available in accordance with feature 4, is added drop-wise with stirring until the freshly formed precipitate is colourless. Traces of heavy metals are precipitated and settle rapidly. Air is blow into the mixture until the dithiol is oxidized or removed in steam. When, after a short time, the mixture no longer smells of dithiol, it is filtered or decanted from the precipitate and allowed to crystallize. In this way a few parts per 10,000,000 of most heavy metals are readily removed but the removal of lead is less efficient.

Example 4

Removal of tellurium from bismuth: To bismuth chloride, suitably dissolved in 3–8 normal hydrochloric acid, dithiol is added as in Example 3 until a coloured product is no longer formed. The tellurium complex, any part thereof reduced to metallic tellurium and the excess of dithiol, are extracted with small quantities of ethylene chloride or other suitable extracting fluid. Any trace of dithiol which may remain in solution is removed as in Example 3, leaving the bismuth-containing solution substantially free from tellurium.

The following example illustrates the indirect use of dithiol.

Example 5

Purification of sodium chloride from traces of potassium: Sodium chloride is dissolved in water to give a 10–30 percent solution and this is slightly acidified with hydrochloric acid. A solution of sodium tetraphenylboron is added in slight excess to precipitate the potassium. The excess of tetraphenylboron ion is in turn precipitated as phenylmercuric chloride by addition of a slight excess of mercuric chloride. Finally the mercury is removed by addition of excess of alcoholic dithiol to the hot solution. Air is passed to remove the excess of dithiol and the solution is filtered, thus leaving an acid solution of the salt containing a trace of boric acid from which the pure salt is separated by addition of hydrochloric acid.

Turning now to feature 2, dithiol added to a solution of metals in aqueous pyridine elicits the colours of the soluble complexes of the following metals—copper (green), cobalt (blue), iron (ii) (red), thallium (orange-yellow), nickel (green), manganese (brownish yellow), and vanadium (sea green), the order of the formation of the complexes being that given. A few sparingly soluble and other less colourful complexes may also be formed for example with mercury, cadmium, zinc, lead and other elements. The following example illustrates the use of this feature of the invention in the removal of traces of iron, commonly encountered in commercial samples of chemicals which, in aqueous solution, give an alkaline reaction.

Example 6

Removal of iron, nickel and the like, from sodium or potassium carbonate, barium sodium or potassium hydroxide, di- or tri-sodium or potassium phosphates; and like basic compounds: A hot strong solution of the compound is extracted with a small volume of a fluid containing pyridine or pyridine bases and dithiol. A suitable composition is dithiol, .01–1 percent, pyridine or pyridine bases, 5–30 percent, together with an inert solvent such as benzene or toluene. In presence of copper, cobalt, iron, nickel and the like the extracting fluid becomes brilliantly and characteristically coloured. The extraction is repeated once or twice more or until the extracts are no longer coloured. Finally steam or air is passed into the hot liquid to remove volatile materials. In this way a few parts per 10,000,000 of iron are easily and quickly removed.

Example 7 illustrates a method for the purification of chemicals which embodies the feature 3 of the invention and may also embody features 4 and 6.

Example 7

Purification of magnesium sulphate: Magnesium sulphate is dissolved to a strong solution in boiling water and hydrogen sulphide is passed into the neutral or slightly acid solution. To the boiling liquid a few drops of a 0.1–1 percent solution of dithiol in chloroform-alcohol, as conveniently provided by feature 4 of the invention, is added slowly to each litre of the solution. The sulphides of heavy metal impurities are thereby caused to coagulate and, after boiling off excess of hydrogen sulphide and dithiol, are removed by filtration. Alternatively, use is made of 0.1–1 percent solution of diacetyldithiol for the same purpose.

The coagulating power of dithiol and of diacetyldithiol may also be turned to good account in analysis. For this purpose a few drops of 0.1–1% alcoholic diacetyldithiol are added to the acid solution before passage of hydrogen sulphide and, after boiling and passing the gas, a small further addition is made. Though this is effective for most purposes there are occasions when it is unsuccessful, as when the solution contains molybdenum. In such cases a trace of 1:8-dimercaptonaphthalene is added in addition when the molybdenum is rapidly and completely precipitated by the hydrogen sulphide, the two reagents may be combined as in Example 8.

Example 8

A mixture is prepared containing thioacetamide or other suitable source of hydrogen sulphide as its main constituent, together with 0.5–5 percent of diacetyldithiol and a like quantity of 1:8-dimercaptonaphthalene. The mixture is used directly, according to the usual procedure, for the precipitation of group 2 metals in qualitative analysis.

Turning next to feature 4, methods for the preparation of suitable derivatives are described in Examples 9 to 11 and methods for preparing dithiol from the same in Examples 12 to 14.

Example 9

Diacetyldithiol may be prepared directly by heating dithiol (1 mol) with an excess of acetic anhydride (2.5–4 mols) at 95–100° for 0.45 hour. The mixture is poured into water when the diacetyldithiol remains as an oil which eventually crystallizes. Alternatively, dithiol (1 mol) is dissolved in normal sodium hydroxide (2 mols), the air over the surface of the liquid being replaced by an inert gas. The mixture is cooled to 0° and acetic anhydride (2 mols) added with shaking. On standing diacetyldithiol separates as an oil which crystallizes. The yield is theoretical and the product may be recrystallized from petrol ether (B.P. 40–60°) or distilled in a good vacuum. It melts at 48° or thereabouts.

Example 10

Dibenzoyldithiol may be prepared as in Example 9 from dithiol (1 mol) in sodium hydroxide (2 mole) with benzoyl chloride (2 mols). It may be crystallized from alcohol and melts at 94° or thereabouts.

Example 11

Zinc dithiol may be prepared by adding dithiol to zinc acetate solution. Unless the reaction is carried out on a very small scale, however, the bulky solid formed occludes much unreacted dithiol. After breaking up, this may later be removed by washing with a solvent, but unless this is performed in absence of air, much dithiol is lost by oxidation.

The difficulty may be overcome in the following way. Excess (more than 1 mol) of pure zinc acetate is dissolved in hot water, at least 50 ml. being allowed for each gram of dithiol to be added. The vessel is fitted with an efficient reflux condenser, and the dithiol, dissolved in a 5–10-fold excess of ethylene chloride or chloroform is added slowly to the briskly boiling liquid. The zinc salt separates in large masses. These are broken as far as possible and the mixture is refluxed vigorously for 2 hours, with additional of more solvent if desired. In this operation the refluxing solvent serves to extract the solid. The mixture is filtered and the white nearly pure very bulky precipitate, now completely free from dithiol, is dried at 90°. If required completely free from dithiodisulphide it may be extracted with carbon disulphide but this is not usually necessary. The yield is theoretical. Analysis indicates that the product has the formula $C_7H_6S_2Zn$.

*Example 12*

Dithiol for use as a reagent from diacetyldithiol and dibenzoyldithiol. Pure potassium hydroxide (0.1 g.) is dissolved by warming with a single drop of water. Alcohol (1 ml.) is added and 50-100 mg. of diacetyldithiol is added. The mixture is held at the boil for 15-20 seconds and is then ready for use. If dibenzoyldithiol is used the mixture must be kept hot for a few minutes. The solutions should be used within 1-3 hours.

*Example 13*

Dithiol as a reagent from the zinc salt: The zinc salt is shaken with 3-10 ml. of industrial alcohol and a few drops of concentrated hydrochloric acid are added; the salt dissolves in a few seconds to give a clear colourless solution which gives the reactions of dithiol.

Alternatively the zinc salt may be added directly to dilute sodium hydroxide solution, 2 normal being suitable, when it dissolves to give the sodium salt of dithiol. The solution rapidly gives a precipitate in air.

Solutions obtained in the ways described in Example 13 contain zinc. They therefore fail to give derivatives of dithiol with metals below zinc in the precipitation table, except that the reaction with iron is obtained though with reduced intensity. But the zinc salt may also be used to give dithiol free from inorganic compounds.

*Example 14*

Dithiol, in absence of inorganic compounds, from the zinc salt. To a suitable volume of, say, 2 normal sulphuric acid a little sodium hypophosphite is added in order to ensure reducing conditions. The required quantity of zinc dithiol is added and the liquid extracted with a small volume of a heavy organic solvent such as ethylene chloride or chloroform. There is no tendency for an emulsion to form. The lower layer, containing the dithiol free from inorganic compounds and oxidation products, is run off and used as desired. For many purposes, as in Examples 1-3, 5 and 7, it is conveniently diluted with alcohol.

Considering now feature 5, standard solutions of dithiol, conveniently of .01 to .05 molar strength, may be prepared immediately from weighed quantities of diacetyldithiol or zinc dithiol. The standardization of the solution, shortly before use, may easily be accomplished by placing it in a burette and adding it dropwise to a known volume of .01 molar mercuric chloride solution mixed with an equal volume of pyridine. If a drop of .01 molar cobalt chloride is added a blue colour appears suddenly when the end point is reached. Since one molecule of dithiol reacts with one atom of mercury the strength of the dithiol solution is easily ascertained. If the titration is conducted hot, diacetyldithiol may be standardized also directly by this means. The same method may be used with dibenzoyldithiol provided a little sodium hydroxide is added.

Dithiol may be used to determine many elements volumetrically. In these titrations the elements form their mercaptides and means are used to detect either the disappearance of the metallic ion or the appearance of free dithiol in the solution. For the first purpose well-established techniques may be used or the simple failure of the solution to give more coloured precipitate on addition of more dithiol may serve as an end point. For the second purpose, use may be made of the appearance of a new colour with a second ion of a metal added as an indicator, or a reagent such as sodium nitroprusside which yields a coloured product with dithiol may be employed.

Occasionally titrations may be made to depend upon the liberation of a base as, for example, in the estimation of gallium when neutral sodium gallate is treated with an excess of dithiol and the liberated sodium hydroxide titrated with standard acid.

Multiple titration is conducted by adding dithiol dropwise to a solution containing a mixture of metals, preferably in presence of an extracting or preferentially wetting solvent such as ethylene chloride. Precipitates are thus removed from the aqueous layer as they are formed and the sharp change in the colour of a freshly formed precipitate indicates the end of the titration of one metal and the beginning of another. Acidity may be reduced after one element is precipitated if so desired. Thus palladium (orange precipitate), mercury (pale yellow), copper (black) and lead (yellow) are easily determined with moderate accuracy but great speed in a solution containing all four elements.

Referring now to feature 7, the rapid field testing of ores might be illustrated by a large number of tests embodying the present invention of which a few together with an indication of the main principles and procedures involved are indicated below.

*Example 15*

*Copper.*—A trace of the ore, placed on a glass slide, is treated with a drop of 2 normal sodium hydroxide and a little zinc dithiol. In presence of copper the solution rapidly becomes orange with non-sulphidic ores in the cold, with sulphidic ores, on warming.

*Iron and cobalt.*—As for copper but a drop of pyridine is used instead of sodium hydroxide. Cobalt gives a blue colour and iron a red. On gently taking to dryness, patches of the separate colours and of green (copper) may be seen when more than one of the metals is present. Powdered zinc dithiol placed on an ore and moistened with pyridine often imparts strong colours to ores containing copper, iron or cobalt, the separate colours appearing as patches. This method is particularly useful in testing for cobalt.

*Tin.*—A few milligrams of the ore is heated for 30 seconds with a pellet of potassium hydroxide and a drop of water. On adding 2 normal hydrochloric acid and zinc dithiol a red precipitate is immediately obtained.

In other cases the coarsely powdered ore may be partly dissolved by boiling for 30 seconds with hydrochloric acid with or without the addition of a crystal of potassium chlorate, or it may be heated for a like period with dry barium nitrate and barium peroxide and the hot tube containing the mixture dropped into concentrated hydrochloric acid placed in a larger tube. To the solution obtained in one of these ways zinc dithiol is added and, if necessary, the acid mixture is diluted. In this way characteristic precipitates are at once obtained with molybdenum, gold, platinum, mercury, antimony, tungsten, bismuth and other elements.

In testing for arsenic the solution of ore in 3-4 normal hydrochloric acid is warmed with a crystal of sodium hypophosphite and zinc dithiol is added when the solution becomes turbid and the turbidity is stable to boiling. In this simple form the test is not specific but zinc dithiol itself will often indicate when interfering elements are present. Thus the appearance of a yellow oil on the surface of the liquid indicates antimony which is the only "more common" element to interfere; but its interference is stopped if a little copper powder is added in the original test. Antimony (v) gives a brilliant red colour in pyridine-hydrochloric acid mixture in presence of dithiol. Vanadium gives a brilliant sea green colour in presence of pyridine. Many other tests also are available and in practically all instances the reactions are highly sensitive and highly selective or specific.

The tests are usually successful when several elements are present together. Thus a solution obtained by heating vanadinite for a few seconds with hydrochloric acid was diluted with pyridine. Addition of a few crystals of diacetyldithiol at once gave an intense sea-green colour (indicating vanadium) together with a brilliant yellow precipitate (indicating lead) which settled rapidly. Reactions for silver, copper, antimony, arsenic, and iron were at once obtained with polybasite. Stannine gave reactions for copper, tin and iron. In these and many other instances the tests proved reliable, exceedingly rapid and sensitive, and required only the simplest apparatus.

What I claim is:

In a method of providing toluene-3:4-dithiol in a given solution containing an element which will form with toluene-3:4-dithiol, a dimercaptide precipitate having a characteristic color, the steps comprising adding to said solution under conditions to react with said element, a reagent selected from the group consisting of diacetyl toluene-3:4-dithiol, dibenzoyl toluene-3:4-dithiol and zinc toluene-3:4-dithiol.

References Cited in the file of this patent

Axley et al.: Anal. Chem., vol. 27, 1955, pages 2000–2003.

Will et al.: Anal. Chem., vol. 25, September 1953, pp. 1363–1366.

Rosenblat: Ibid., vol. 27, June 1955, pages 951–954.

Welcher: "Organic Anal. Reagents," vol. IV, 1948, pages 122, 126 and 127.

Clark: "Analyst," 1936, vol. 61, page 242.